UNITED STATES PATENT OFFICE.

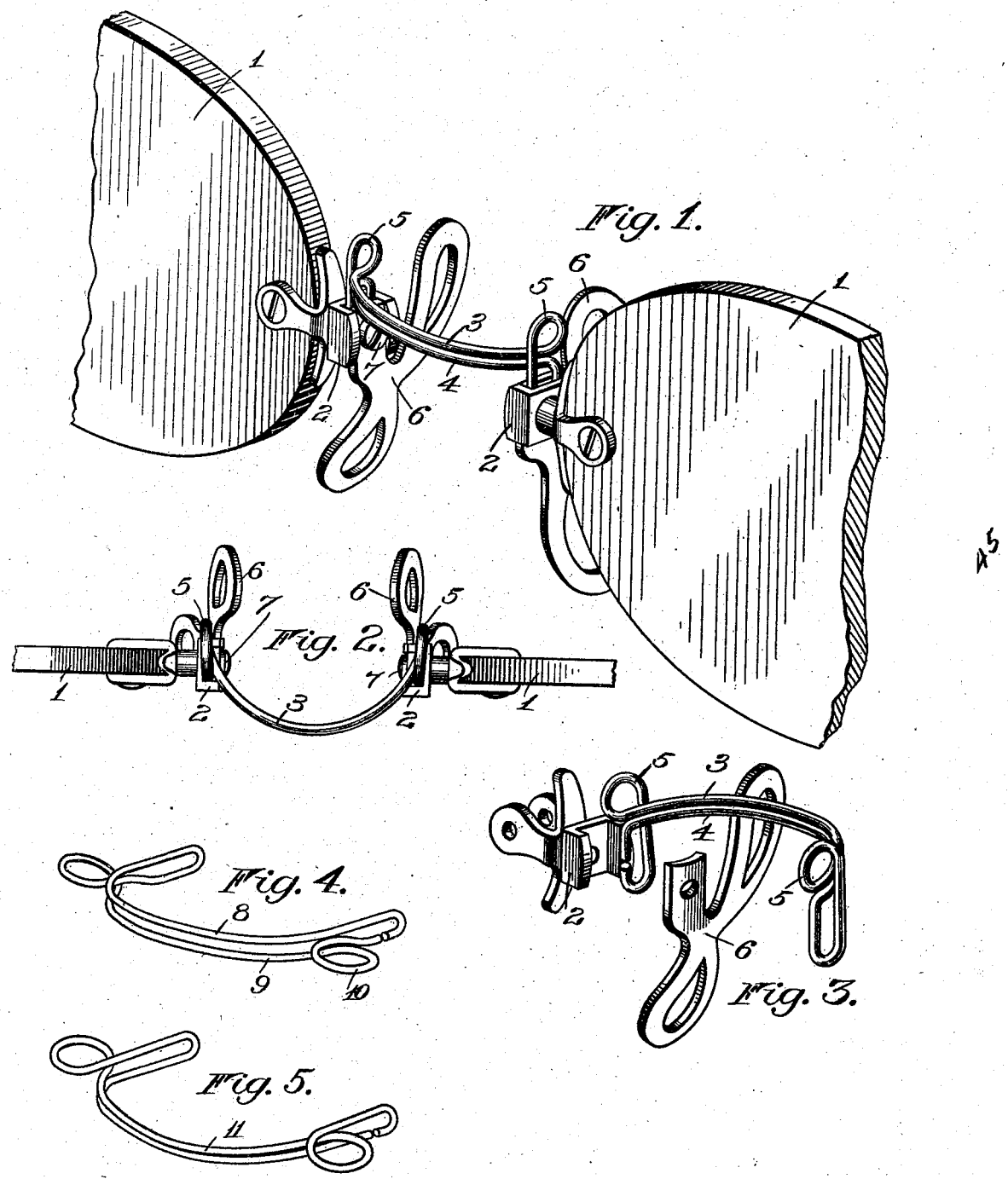

LOUIS B. BECKER, OF NEW YORK, N. Y., ASSIGNOR, BY DIRECT AND MESNE ASSIGNMENTS, OF ONE-HALF TO LEO F. ADT, OF ALBANY, NEW YORK, AND ONE-HALF TO E. KIRSTEIN SONS COMPANY, OF ROCHESTER, NEW YORK, A CORPORATION OF NEW YORK.

EYEGLASSES.

No. 885,829.  Specification of Letters Patent.  Patented April 28, 1908.

Application filed January 24, 1907. Serial No. 353,764.

*To all whom it may concern:*

Be it known that I, LOUIS B. BECKER, of New York city, county and State of New York, have invented certain new and useful Improvements in Eyeglasses; and I do hereby declare the following to be a full, clear, and exact description of the same, reference being had to the accompanying drawings, forming a part of the specification, and to the reference-numerals marked thereon.

My present invention relates to improvements in eyeglasses, and more especially to that class wherein relative movement of the lenses serves to operate the nose guards, and the object of the present invention is to provide a bridge spring for connecting the lenses that will permit ample movement of the lenses without unduly straining the metal of the bridge, and which will afford sufficient action to firmly hold the eyeglasses in proper position before the wearer's eyes, the bridge presenting a neat appearance and capable of being made of drawn stock.

To these and other ends the invention consists in certain improvements and combinations of parts all as will be hereinafter more fully described, the novel features being pointed out in the claims at the end of the specification.

In the drawings: Figure 1 is a perspective view of a pair of eyeglasses embodying a bridge spring constructed in accordance with my present invention. Fig. 2 is a plan view of the eyeglasses shown in Fig 1. Fig. 3 is a perspective view of the bridge spring shown in the preceding figures, and the stud and guard separated therefrom, and Figs. 4 and 5 are perspective views of other forms of bridge springs constructed in accordance with my present invention.

Similar reference numerals in the several figures indicate similar parts.

In the present invention, instead of forming the bridge spring with a single strip extending between the studs or points of attachment as heretofore, a plurality of connecting portions are employed between the points of attachment which will be subjected to bending action when the lenses are manipulated to operate the nose guards, and the combined spring action of the parts provides an ample and even spring action for firmly holding the guards in engagement with the wearer's nose, the distribution of the metal of the bridge into several strips or members reducing the internal stresses of the metal incident to the bending action and thus preventing breakage. The plural connecting members of the bridge spring also enable the loops or resilient portions to be arranged and distributed among the members in different ways in order that the best action of the spring may be secured.

The bridge spring shown in Figs. 1, 2 and 3 is shown applied to the ordinary rimless eyeglasses embodying the lenses 1, having the studs or attaching devices 2 at their proximate ends, and the bridge spring in its present form is adapted for attachment to these studs. The spring shown in these figures embodies a pair of members 3 and 4, the member 3 in this instance forming an upper portion having its ends extending outwardly and rearwardly, thence bending upwardly, forwardly and downwardly to the stud, the ends of this member of the bridge being thus formed into loops or coils 5 arranged in vertical planes disposed transversely of the lenses and having their free ends adapted to be secured in the boxes of the studs. The lower member 4 of the bridge in the present form is preferably curved to conform to that of the upper member and has its ends extending directly to the boxes of the studs at points in rear of the attached ends of the upper member, and the ends of both members are secured to the studs in any appropriate manner, the nose guards 6 in the present instance being fitted over the ends of the spring and firmly clamped against them by means of the usual fastening screw 7.

The spring shown in Fig. 4 embodies an upper member 8 which is preferably bowed forwardly in a horizontal plane, its ends extending rearwardly to the attaching devices, and the lower member 9 is provided with loops or coils 10 formed therein by bending the material outwardly, forwardly, inwardly and rearwardly, the free ends of the coils thus formed being adapted to be attached to the stud or attaching device. The spring shown in Fig. 5 is similar to that shown in Fig. 4, although the resilient loop or coil is formed in the upper member 11 of the spring.

The several forms of springs shown are formed of drawn stock and it is generally preferable to form the entire spring of a single piece of material, although if preferred, the spring may be otherwise formed, and in these forms, the spring member having the bends or coils therein serves to afford ample spring action to hold the nose guards firmly against the wearer's nose while the other member of the spring coöperates therewith to afford sufficient firmness to support the lenses in proper positions before the wearer's eyes, and also to limit the turning movement of the lenses in opening the nose guards.

Eyeglasses provided with bridge springs of the forms shown yield more readily in substantially a horizontal plane when the lenses are turned to operate the nose guards, although the guards will be separated when the lenses are turned in a vertical plane, or in planes intermediate the latter and a horizontal plane and in the form shown in Fig. 1, the resilient portions of the bridge are arranged above the studs or points of attachment so that the separation of the guards at all points is insured when the lenses are operated to remove the eyeglasses. The action of the spring, however, may be varied by different arrangements of the loops, coils or resilient portions thereof, and a different number of connecting members may be employed on the bridge as may be desired, and these members may be either formed integrally or in separate parts, as will be readily understood, and in some cases the same action may be obtained by a different arrangement of the resilient portions of the bridge.

Of course it will be understood that, although the bridges in the forms shown are made of round stock, the invention is not so limited, as the springs may be made of stock of different cross sections, substantially flat stock being found advantageous in some instances.

I claim as my invention:

1. In eyeglasses, the combination with the lenses, and nose-guards, of a bridge spring attached to the lenses and having a plurality of resilient members adapted to span the nose and to permit relative turning movement of the lenses for operating the nose-guards the ends of the bridge being formed into eyes secured to the lenses.

2. In eyeglasses, the combination with the lenses, and nose-guards attached thereto, of a bridge spring attached to the lenses and having an intermediate portion embodying a plurality of nose spanning portions, one of said portions being provided with a resilient bend for permitting relative turning movement of the lenses to operate the nose-guards.

3. In eyeglasses, the combination with the lenses, and nose-guards attached thereto, of a bridge spring attached at its ends to the lenses and having an intermediate portion embodying a pair of nose spanning members, the latter being provided with resilient bends for permitting relative turning movement of the lenses to operate the nose-guards.

4. In eyeglasses, the combination with the lenses, and nose-guards movable therewith, of a bridge spring attached at its ends to the lenses and embodying a pair of nose spanning members, one of the latter being provided with resilient bends for permitting relative turning movements of the lenses, and the other member being less resilient and serving to limit the turning movements of the lenses.

5. A bridge spring for eyeglasses embodying suitable attaching portions, and an intermediate portion embodying a plurality of nose spanning members, one of the latter being provided with resilient bends for permitting relative turning movements of the lenses.

6. A bridge spring for eyeglasses, embodying suitable attaching portions, and an intermediate portion embodying a pair of substantially parallel nose spanning members, one of said members being provided with a pair of resilient bends for permitting relative movement between the lenses.

7. A bridge spring for eyeglasses embodying suitable attaching portions, and an intermediate portion embodying a nose spanning member provided with resilient coils for permitting relative movement of the lenses, and a second nose spanning portion extending substantially parallel to the member first mentioned.

8. In eyeglasses, the combination with the lenses having suitable attaching devices thereon, and nose-guards adapted to be attached thereto, of a bridge spring embodying suitable attaching portions engaging the attaching devices of the lenses, and an intermediate nose spanning portion embodying a pair of substantially parallel members arranged above the tops of the attaching devices, one of said members being provided with a resilient portion for permitting relative turning movement of the lenses.

9. A bridge spring for eyeglasses composed of a single strip of material doubled to form a plurality of substantially parallel resilient nose-spanning members, and lens attaching eyes at the ends of the spring.

LOUIS B. BECKER.

Witnesses:
EDWARD J. KORNFELD,
EDWARD T. GRADY.